United States Patent [19]

Grimes

[11] Patent Number: 5,034,975
[45] Date of Patent: Jul. 23, 1991

[54] VOICE ANNOUNCEMENT DEVICE FOR IMPROVING FUNCTIONALITY OF MULTI-LINE TELEPHONES

[75] Inventor: Gary J. Grimes, Thornton, Colo.

[73] Assignee: AT&T Bell Laboratories, Murray Hill, N.J.

[21] Appl. No.: 454,555

[22] Filed: Dec. 21, 1989

[51] Int. Cl.⁵ .................. H04M 1/57; H04M 3/50; H04M 3/58

[52] U.S. Cl. .................................... 379/67; 379/89; 379/142; 379/208; 379/212; 379/396

[58] Field of Search .................... 379/88, 89, 67, 209, 379/208, 212, 142, 396

[56] References Cited

U.S. PATENT DOCUMENTS

| | | | |
|---|---|---|---|
| 4,661,975 | 4/1987 | Brecher | 379/215 |
| 4,899,358 | 2/1990 | Blakley | 379/67 |
| 4,899,374 | 2/1990 | Van Landeghern | 379/215 |
| 4,942,601 | 7/1990 | Park | 379/209 |
| 4,947,421 | 8/1990 | Toy et al. | 379/67 |

Primary Examiner—Thomas W. Brown
Attorney, Agent, or Firm—John C. Moran

[57] ABSTRACT

Apparatus that allows a called party, while engaged in a first call, to indicate to a second calling party that he/she is aware of the second call and will respond to the second call within a waiting time interval. The second calling party is given a "personal answer" message indicating that the called party will answer the second call within the waiting time interval. The second calling party is then placed on hold so that when the called party terminates the first call, the called party can answer the second call.

44 Claims, 11 Drawing Sheets

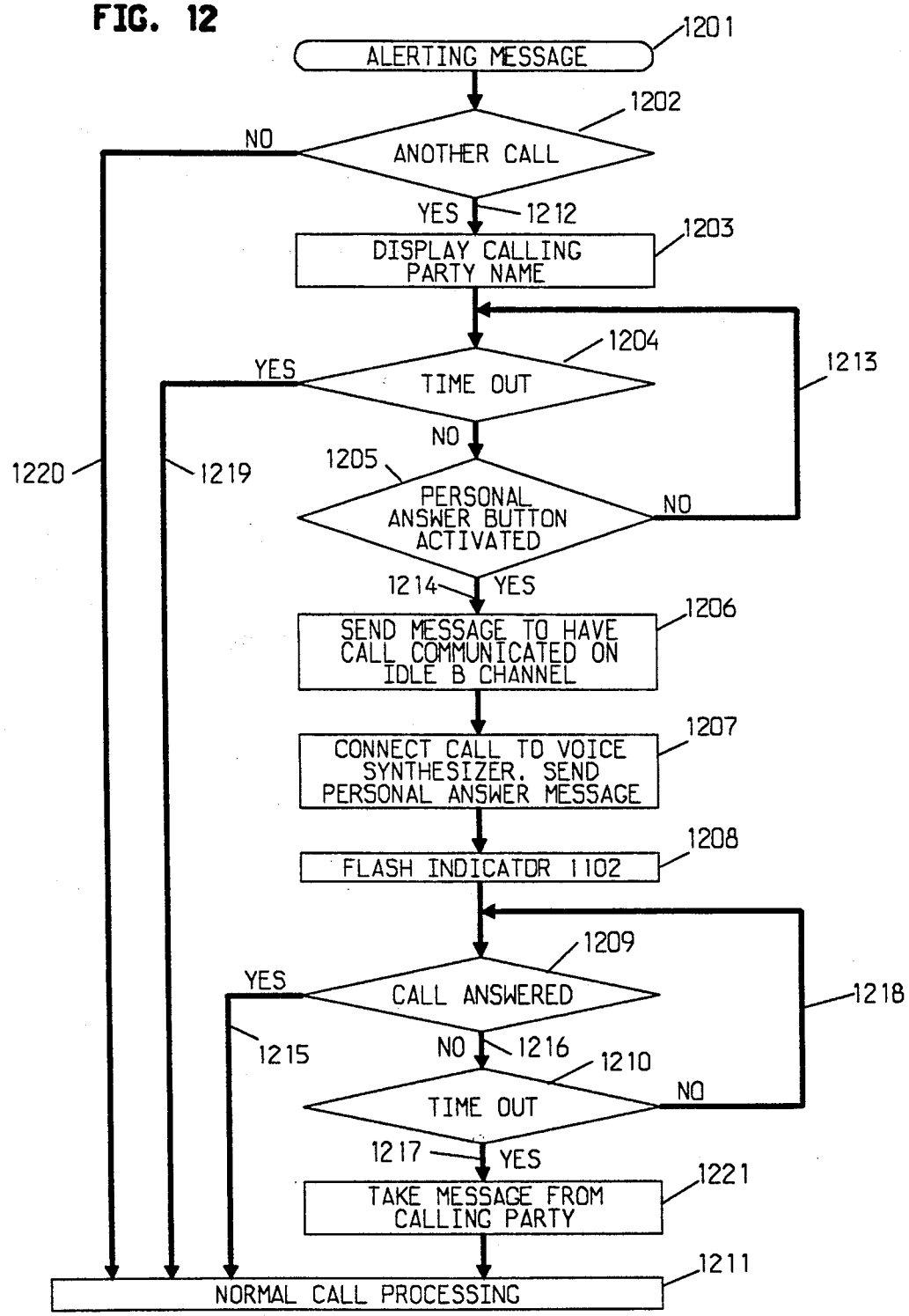

VOICE ANNOUNCEMENT DEVICE FOR IMPROVING FUNCTIONALITY OF MULTI-LINE TELEPHONES

TECHNICAL FIELD

The present invention relates to telephone switching equipment and, in particular, to the provision of additional functionality for handling multiple calls on a multi-line telephone set.

BACKGROUND OF THE INVENTION

A common problem in the utilization of modern telephone sets is that of a telephone user (also referred to as a called party) who, while engaged in a first call, receives a second call. The called party's choices are to hang up on the first calling party to answer the second call, to place the first calling party on hold to answer the second call, or to transfer the second call to a secretary or a message answering system such as a voice mail system. The first two alternatives are not normally convenient because they represent inappropriate telephone etiquette. The last alternative is undesirable because it often results in "telephone tag," where two individuals periodically try to contact each other via the telephone and fail because the other person is again on the telephone. Much time is wasted in institutional and corporate settings due to telephone tag. In such environments, telephone conversations often do not last for long periods of time; hence, if the second calling party could wait for a convenient amount of time, the called party could then finish the first call and proceed with the second call.

Modern customer switching systems have provided many helpful aids in attempting to overcome the above problem. Systems such as the AT&T System 85 Communication System with an attached AT&T AUDIX system (voice mail system) are capable of displaying the name of the second calling party on the alpha-numeric display of an electronic telephone set in response to actuation of the "inspect mode" button. The called party decides from the displayed name if she/he will terminate the first call in order to answer the second call, place the first call on hold to answer the second call, or transfer the second call to the voice mail system by actuation of the "send all calls" button. If the second call is transferred to the voice mail system, that system transmits a prerecorded announcement to the second calling party stating that the called party is busy. The system also gives the second calling party the opportunity to leave either a voice mail message or be connected to the called party's secretary. The second calling party indicates his/her choice to the voice mail system by actuating the appropriate multi-frequency dialing buttons on his/her telephone. The voice mail system is useful for brief, but not extended, messages.

U.S. Pat. No. 4,661,975 discloses a system that provides similar capabilities to those previously described but are provided for an analog multi-frequency dialing telephone set. In the disclosed system, the called party who, while engaged in a first call receives a second call, can via a multi-frequency key pad (1) send busy tone to the second calling party and terminate the second call, (2) send a prerecorded message to the second calling party and terminate the second call, (3) transfer the second call to an alternate station, or (4) place the first call on hold to answer the second call by a flash hook operation.

None of the above alternatives are wholly satisfactory from the called party's viewpoint.

SUMMARY OF THE INVENTION

A departure in the art is achieved by an apparatus and method that allows a called party, while engaged in a first call, to indicate to a second calling party that he/she is aware of the second call and will respond to the second call within a waiting time interval. Advantageously, the second calling party is given a "personal answer" message indicating that the called party will answer the second call within the waiting time interval. The second calling party is then placed in a standby mode (on hold) so that when the called party terminates the first call, the called party can answer the second call.

In a first preferred embodiment in accordance with the invention, a customer switching system switches a second call intended for a called party to a voice mail system. The voice mail system transmits to the second calling party a message indicating the name of the called party and a predetermined amount of time (the waiting time interval) that will elapse before the called person responds to the call. In addition, the voice mail system gives the second calling party the option to leave a voice mail message or to contact the called party's secretary. If the second calling party chooses not to leave a voice mail message or contact the secretary, the voice mail system then indicates this fact to the customer switching system. The system next waits until the called party completes the first call and then connects the called party to the second calling party if the waiting time interval has not elapsed.

In a second preferred embodiment in accordance with the invention, a customer premises unit is connected to a communication switching system via two telephone lines. Each of the telephone lines is individually connected to a telephone set, and the telephone lines are also connected to an audio unit. While a called party is enaged in a first call, the called party can switch a second call from a calling party to the audio unit. The called party is notified of the second call by ringing. In response to a signal from the called party, the audio unit transmits a message to the calling party indicating that the called party is aware of the second call and will respond within a waiting time interval. In addition, the audio unit gives the calling party the option of leaving a voice message for the called party. If the calling party does not leave a voice message, the audio unit times for the waiting time interval. After completing the first call, the called party can answer the second call if the waiting time interval has not elapsed. During the waiting time interval, the called party can send a second signal to the audio unit. In response to the second signal, the audio unit transmits a continuation message to the calling party. The continuation message gives the calling party the option of leaving a voice message or waiting for the called party to finish the first call. If the calling party choses to wait, the audio unit restarts timing for the full waiting time interval. Further, if the waiting time interval elapses, the audio unit again gives the calling party the option of leaving a voice message.

In a third preferred embodiment in accordance with the invention, a communication terminal is connected to a communication switching system via a communication link having two data/audio channels and a signaling channel. While a called party is engaged in a first call, the called party is notified of a second call by the communication terminal responding to an alerting message from the communication switching system. The communication terminal negotiates with communication switching system the communication of the second call on an idle data/audio channel. By actuating a button on the communication terminal, the called party can send a personal answer message to the calling party informing the calling party that the called party is aware of the second call and will respond within a waiting time interval. If the called party does not respond within the waiting time interval, the communication terminal transmits a voice message to the calling party which gives the calling party the option of leaving a voice message for the called party. Advantageously, the personal answer message may have either a data or audio format.

Other and further aspects of the present invention will become apparent during the course of the following description and by reference to the accompanying drawing.

BRIEF DESCRIPTION OF THE DRAWING

Referring now to the drawing:

FIG. 12 illustrates, in flow chart form, a program for controlling the operation of terminal controller 1003 of FIG. 10 in accordance with the invention.

DETAILED DESCRIPTION

Figure 1:
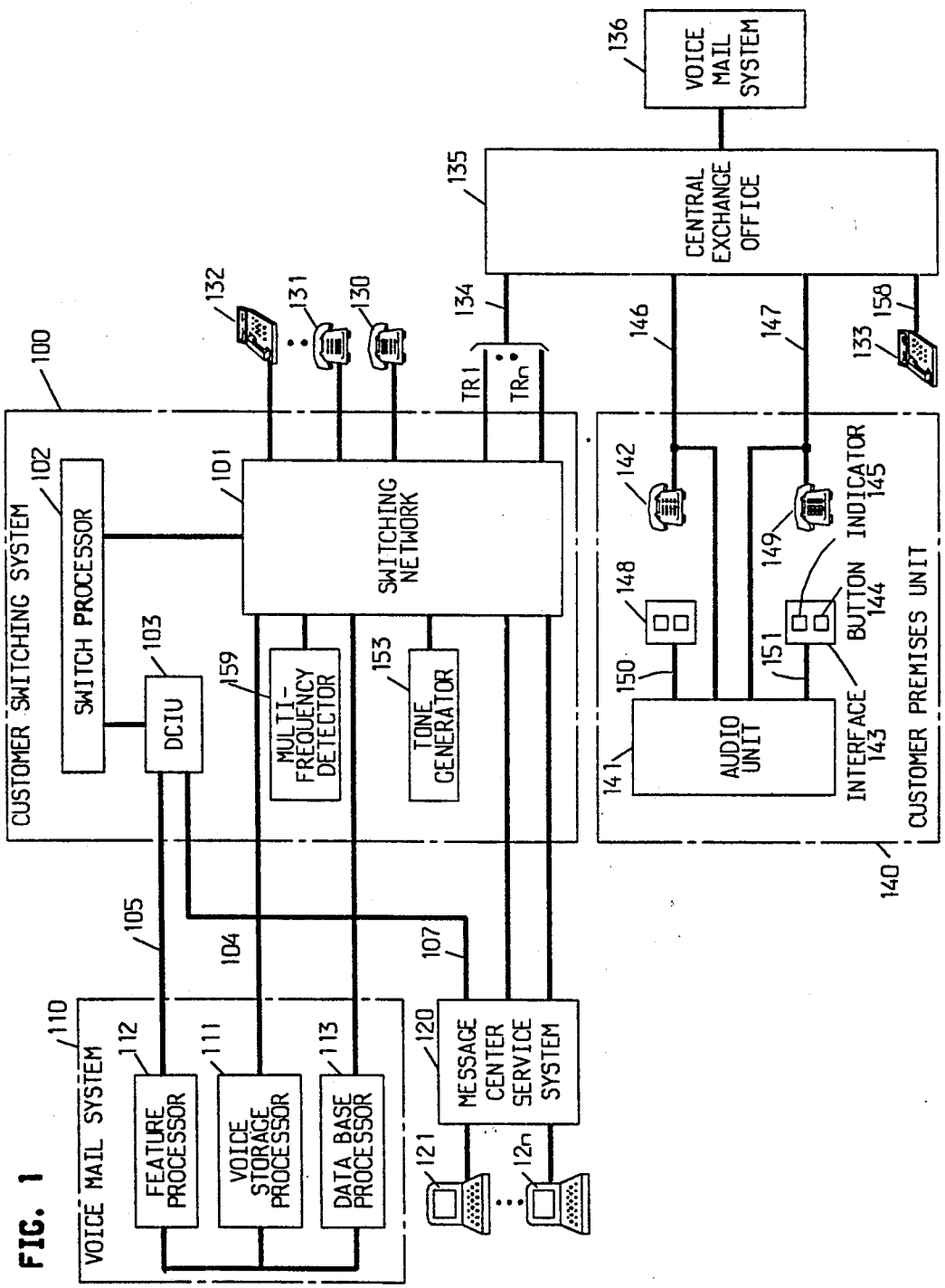
FIG. 1 illustrates an array of systems and includes three different embodiments in accordance with the invention.

FIG. 1 illustrates three embodiments in accordance with the invention that allow a called party, while engaged in a first call, to indicate to a second calling party that the called party will respond to the second call within a waiting time interval. The first embodiment is a combination of systems 100 and 110. Customer premises unit 140 is the second embodiment, and communication controller 133 is the third embodiment. The function that allows a called party to respond to a second call via a voice announcement device is referred to as the personal answer message feature.

The following is an example of the first embodiment in accordance with the invention. If telephone 130 is engaged in a first call with electronic telephone set 132 via switching network 101 and a second call is placed from telephone 131 to electronic telephone set 132, the called party activates the personal answer button on set 132. In response to activation of the latter button, switching processor 102 interconnects telephone 131 to voice mail system system 110 via an audio line in cable 104. In addition, switching processor 102 transmits a digital message to feature processor 112 of voice mail system 110 via DCIU 103 and cable 105 regarding (1) the personal answer message to be generated, (2) the telephone number of the second calling party, (3) telephone number of the called party, and (4) the identification of the audio link within cable 104 that transfers the second call to voice mail system 112. Feature processor 112 then utilizes the called party number to access database processor 113 to obtain the name of called party. Utilizing the name of the called party, feature processor 112 actuates voice storage processor 111 to transmit via the audio link the personal answer message to the second calling party on telephone 131. Advantageously, the message is "John Doe is presently engaged in another telephone conversation, but he is aware of your call and will be with you in thirty seconds. If you wish to leave a voice mail message, press "1"; if you wish to speak to his secretary, press "0"; or if you wish to speak to John Doe, please wait." Feature processor 112 then transmits a message back to switching processor 102 indicating that the call from telephone set 131 should be camped onto electronic telephone set 132. If the called party does not respond within the waiting time interval, switching processor 102 processes the call in the normal manner. The normal manner may include transferring the call to message center service system 120, to voice mail service system 110, or to a secretary so that a message can be taken for the called party. The operation of the systems 100, 110, and 120 illustrated in FIG. 1 is explained in greater detail in U.S. Pat. No. 4,790,003.

Figure 2:
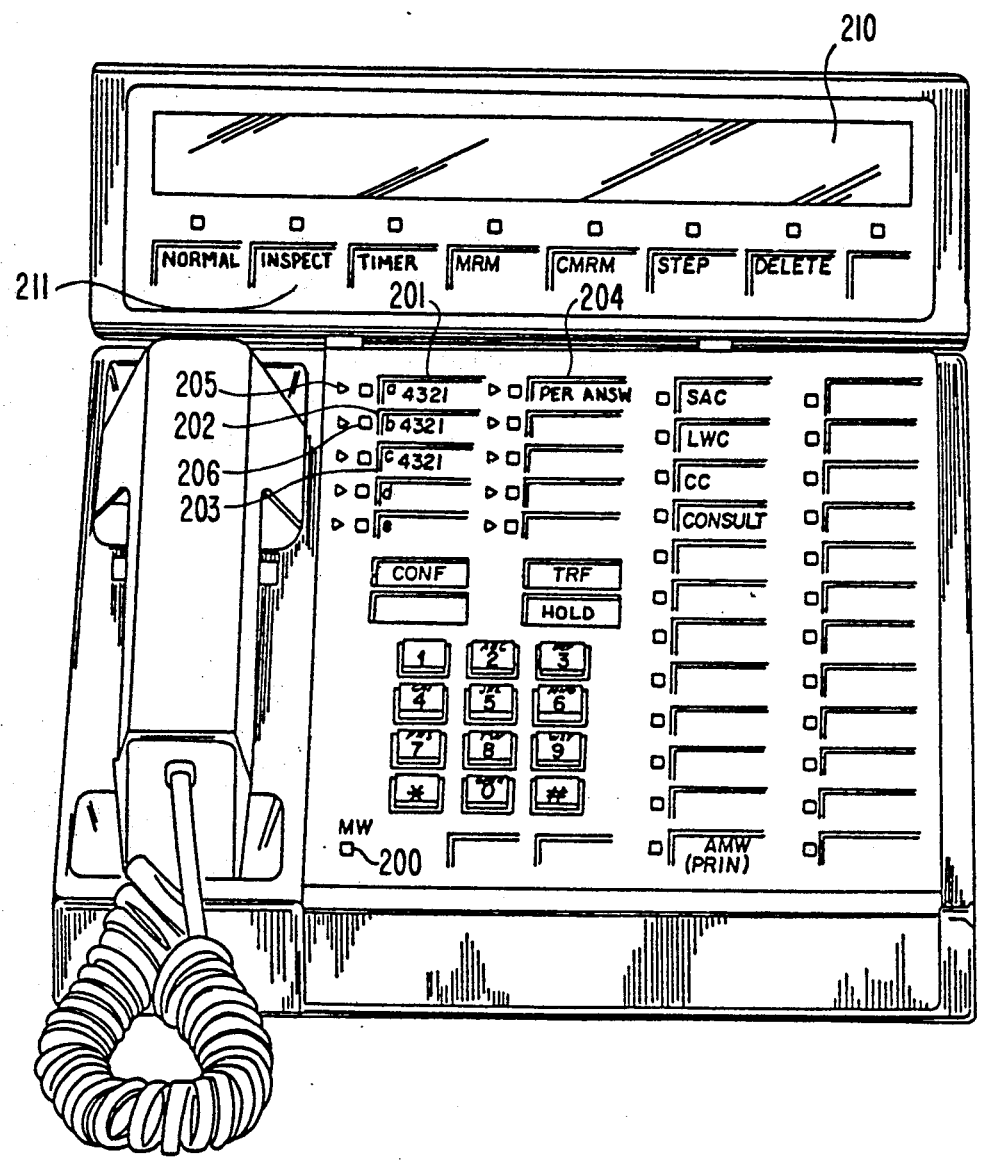
FIG. 2 illustrates an electronic telephone set.

The following describes the operations that the called party performs on electronic telephone set 132 in the above example. The manner in which control, audio, and data signals are transmitted between electronic telephone set 132 and customer switching system 100 is described in U.S. Pat. No. 4,734,931. When the called party is speaking to the first calling party on telephone set 130, this fact is indicated on electronic telephone set 132 (as illustrated in FIG. 2) by indicator lights 205 being illuminated. When the second call from telephone set 131 is detected by switching processor 102, the latter processor communicates information to electronic telephone set 132 notifying the called party of the presence of the second call by flashing indicator light 206 and activating the ringer in electronic telephone set 132. The called party determines who is calling by activating inspection button 211. The name of the second calling party is then display on alphanumeric display 210 using well known techniques as described in U.S. Pat. No. 4,790,004. If the called party wishes to have the personal answer message transmitted to the second calling party, the called party depresses personal answer button 204. In response to the actuation of personal answer button 204, switching processor 102 transfers the second call to voice mail system 110. The latter system sends the personal answer message to the second calling party and determines whether the second calling party wants to be placed in a standby mode (on hold), to leave a voice mail message, or to be routed through normal call coverage to a secretary.

If the second calling party wants to be placed on hold, the following events take place: after receiving confirmation from voice mail system 110 that the personal answer message has been transmitted to telephone set 131 and that the second calling party wishes to be placed on hold, switching processor 102 causes indicator light 206 to flash indicating that this call has been placed on hold. As is well known in the art, service processor 102 may provide music to the second calling party via switching network 101. When the called party completes the first call, the called party pushes button 202 to pick up the second call. If the second calling party on telephone set 131 has chosen to leave a message rather than be put on hold, service processor 102 is informed of this fact by voice mail service system 110. Service processor 102 activates indicator light 200 indicating that a message is waiting. The called party can retrieve the message using well known techniques.

Figure 3:
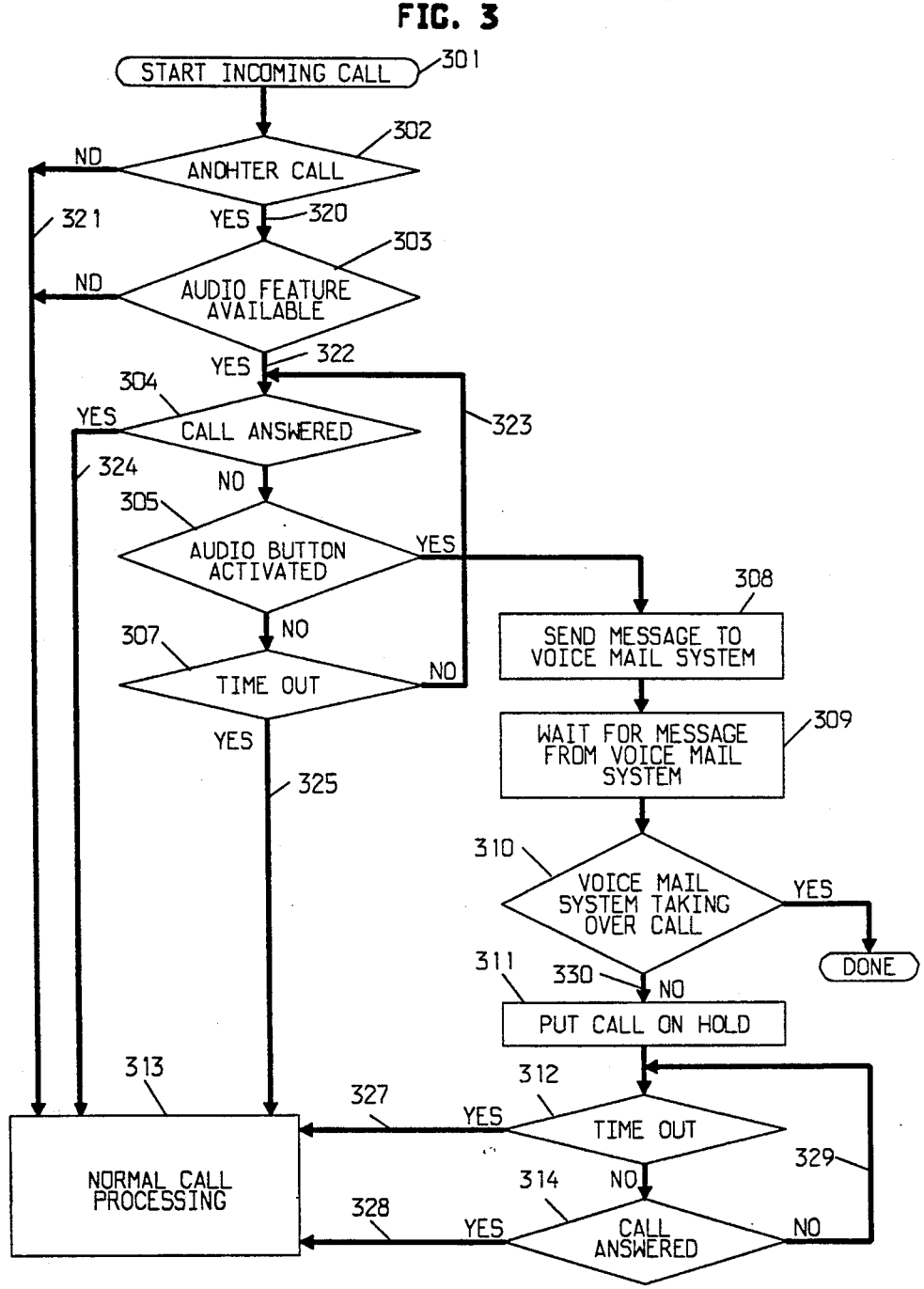
FIG. 3 illustrates, in flow chart form, a program for the customer switching system that uses the voice mail system illustrated in FIG. 1 in accordance with the invention.

FIG. 3 illustrates, in flow chart form, a programming routine executed by switch processor 102 to provide the personal answer message feature. Block 301 determines if a call has originated for a telephone set. Decision block 302 determines if the called telephone set is presently handling a call (first call). If there is not a first call, then control is transferred via path 321 to block 313 where switch processor 102 processes the call using well known techniques. If the telephone set is presently handling a first call, control is transferred via path 320 to decision block 303 which determines called party a reaction time interval to respond to the second call by answering the call or by pushing the personal answer button before the call is transferred to normal call processing. Decision block 307 provides this the reaction time interval. Until the reaction time interval has elapsed, decision block 307 continuously transfers control back to decision block 304. After the reaction time interval has expired, decision block 307 transfers control via path 325 to block 313. If the called party answers the second call, then control is passed to block 313 via path 324. If the called party activates the personal answer button, decision block 305 transfers control via path 326 to block 308.

In block 308, switch processor 102 transmits to voice mail system 110 a message containing a request to generate the personal answer message, the calling party's number, the called party's number, and the identification of the audio link in cable 104 that communicates the call to voice storage processor 111. Also in block 308, switch processor 102 connects the second calling telephone set to the identified audio link via switching network 101. In block 309, switch processor 102 waits for a message from voice mail system 110. When the message is received from voice mail system 110, decision block 310 determines if the calling party indicated a decision to be placed on hold. If the calling party has indicated the decision to be placed on hold to voice mail system 110, control is transferred via path 330 to block 311. If the second calling party has chosen to leave a message, then switch processor 102 terminates this call with respect to the personal answer message feature.

Block 311 places the second call to be placed on hold using the standard call processing features of switch processor 102. Block 311 also indicates this fact to the called party as described in the previous paragraph. Control is then transferred to decision blocks 312 and 314 which provide the called party the waiting time interval to answer the second call. If the called party answers the second call during the waiting time interval, decision block 314 detects this fact and control is transferred to block 313 via path 328 for normal processing of an answered call. If the second call is not answered during the waiting time interval, control is transferred to block 313 via path 327 for the call to be processed as an unanswered call.

Figure 4:
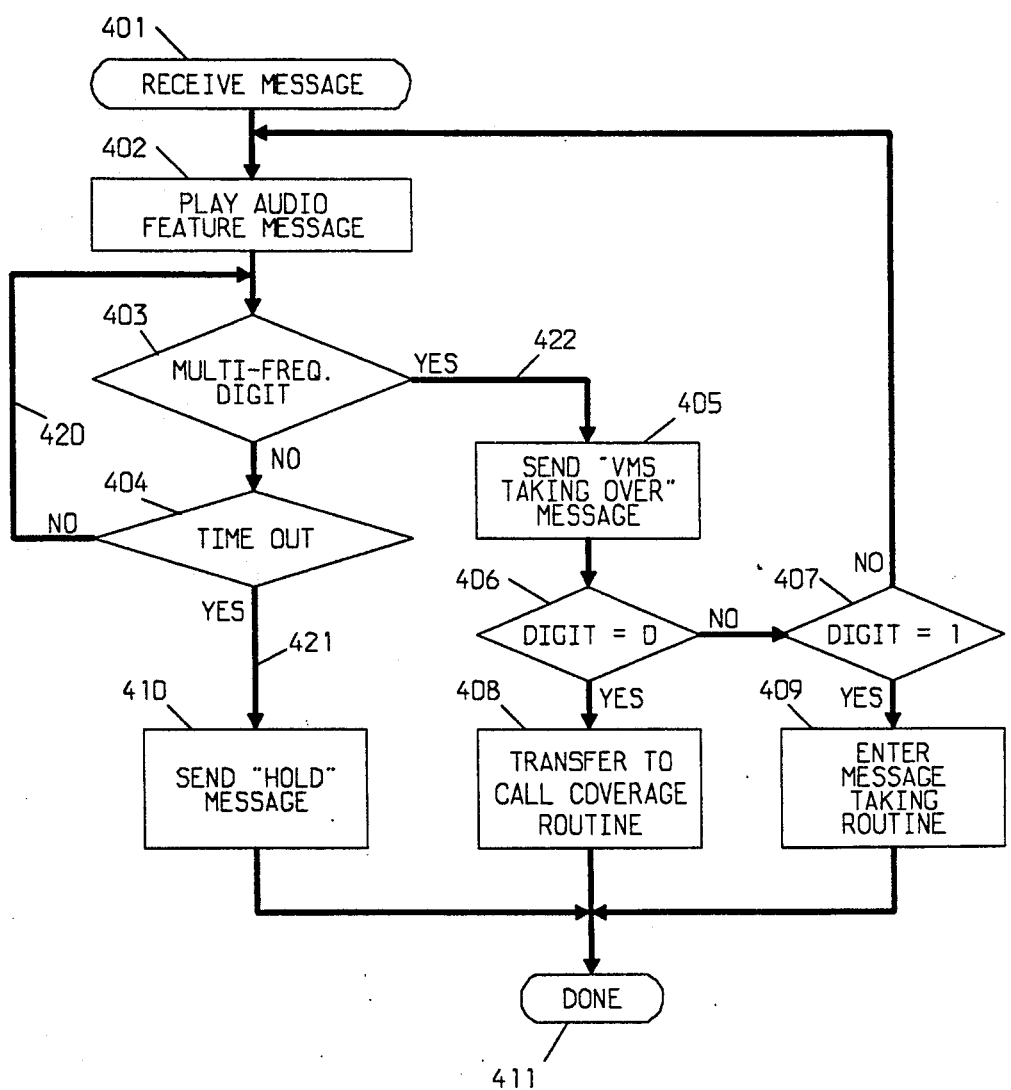
FIG. 4 illustrates the program, in flow chart form, for the voice mail system system in accordance with the invention.

FIG. 4 illustrates the portion of the program of feature processor 112 which implements the personal answer message feature. When feature processor 112 receives a message indicating that the personal answer message feature is invoked, control is transferred to entry point 401. Block 402 transmits the personal answer message on the audio link selected by switch processor 102. After the personal answer message is transmitted, control is passed to decision blocks 403 and 404 so that the calling party has an opportunity to indicate the desired course of action. Decision block 403 detects when a multi-frequency key is depressed on the calling telephone set. If no key is detected, decision block 403 transfers control to decision block 404. The latter block performs a timing function for the reaction time interval during which the multi-frequency testing is done. If the reaction time interval has elapsed indicating that the second calling party wants to be placed on hold, control is transferred via path 421 to block 410. The latter block sends the message that the second calling party wishes to be put on hold to switch processor 102 via path 105 and DCIU unit 103. If the reaction time interval has not elapsed, decision block 404 transfers control back to decision block 403 via path 420.

If a multi-frequency digit is detected by decision block 403, control is transferred via path 422 to block 405. Block 405 generates a message indicating that the voice mail system is now taking over the call and transmits this message to switch processor 102. Decision blocks 406 and 407 then determine which multi-frequency character has been detected. If the digit "0" is detected, control passes to block 408 which causes switch processor 102 to handle the second call via call coverage (secretarial pick-up) using well-known techniques in the art for coordinating the transfer of the second calling party from voice mail system 110 to call coverage. If decision block 407 detects the digit "1" indicating that the second calling party wants to leave a message for the called party on voice mail system 110, then block 409 causes the normal functions for taking messages of voice mail service system 110 to be executed.

Advantageously, the benefits of the invention can also be applied to simple telephone sets such as telephone set 130 equipped with multi-frequency dialing. If the user of telephone set 130 (the called party) is engaged in a first call and a second call is placed to telephone set 130, switching processor 102, which utilizes tone generator 153 and switching network 101, gives a brief ringing tone. This tone is heard only by the called party. This brief ringing tone notifies to the called party that a second call is waiting. If the called party wishes to have the personal answer message sent to the second calling party, the called party actuates a flash hook operation. Switching processor 102 responds to the flash hook by connecting the second calling party to voice mail system 110 as previously described. If voice mail system 110 determines that the second calling party wishes to be placed on hold for the waiting time interval, switching processor 102 marks the second call as being camped onto telephone set 130. Switch processor 102 transmits, via tone generator 153 and switching network 101, a "call on hold" tone to telephone set 130. This tone is heard only by telephone set 130.

When the called party terminates the first call, the second call is immediately connected to telephone set 130. If the second call is terminated or if the waiting time interval lapses before the first call is terminated, the called party receives the "call on hold" tone a second time to signify that the second call is no longer present.

Figure 5:
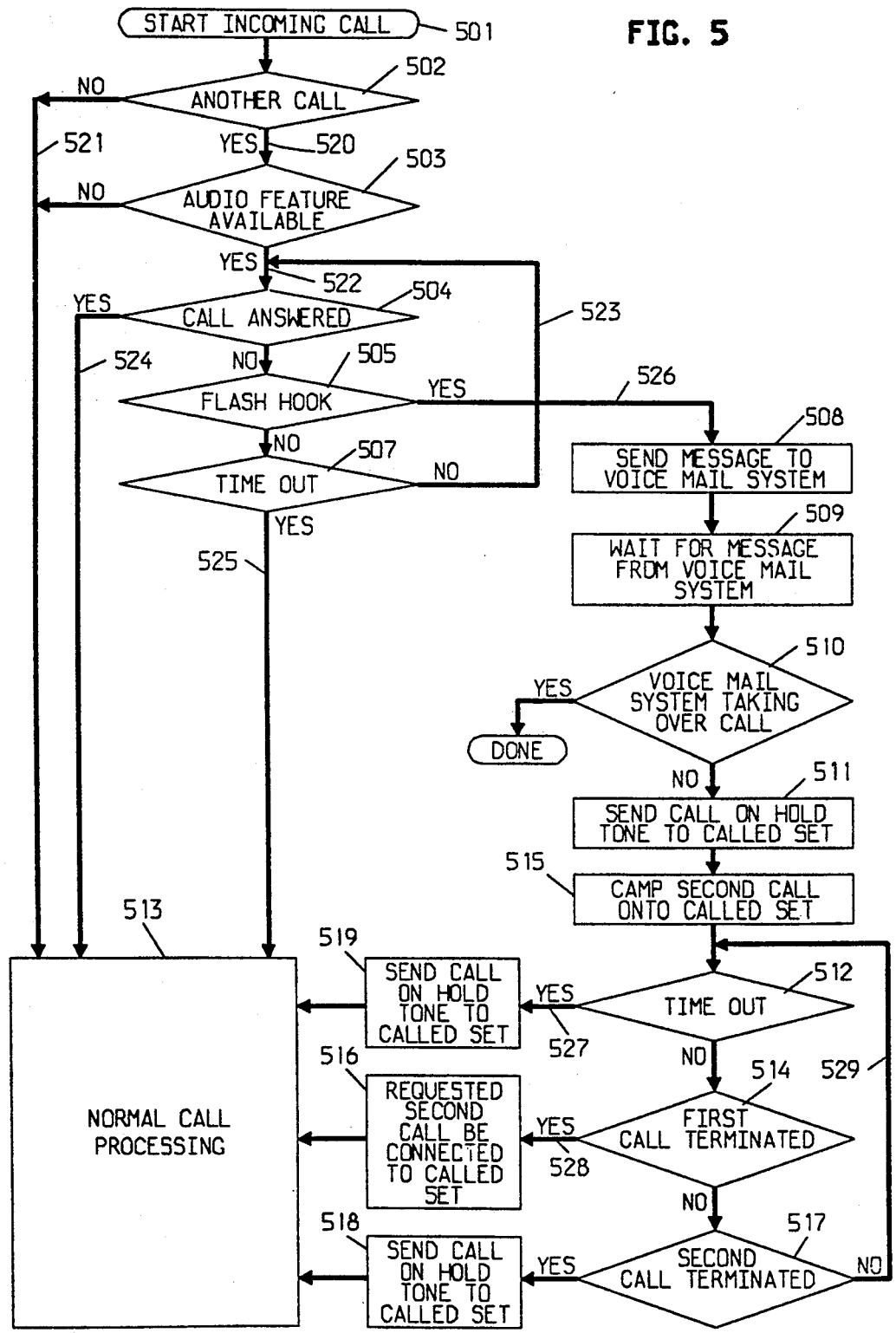
FIG. 5 illustrates, in flow chart form, a program for the customer switching system illustrated in FIG. 1 using a standard telephone set in accordance with the invention.

FIG. 5 illustrates, in flow chart form, the program routine executed by switch processor 102 that provides the personal answer message feature for analog telephone sets equipped with multi-frequency dialing. Block 501 determines that a call has originated for the telephone set. Decision block 502 determines if the called telephone set is busy with a first call. If the telephone is not busy, control is transferred via path 521 to block 513 where switch processor 102 processes the call using well known techniques. If the telephone set is busy, control is transferred via path 520 to decision block 503 which determines whether or not the personal answer message feature is administered for this particular telephone set. If the feature is administered for the telephone set, control is transferred via path 522 to decision block 504. If the feature is not administered for the telephone set, control is passed via path 521 to block 513.

Blocks 504, 505, and 507 give the called party a reaction time interval in which to respond to the second call. During this time, the called party can answer the call or perform a flash hook before the second call is transferred to normal call processing. Descision block 507 provides the reaction time interval and continuously returns control to decision block 504 until the reaction time interval is finished; whereupon decision block 507 transfers control via path 525 to block 513. If the called party answers the second call, then control is passed to block 513 via path 524. If the called party executes a flash hook operation, decision block 505 transfers control via path 526 to block 508.

In block 508, switch processor 102 transmits to voice mail system 110 a message containing a request to generate the personal answer message, the calling party's number, the called party's number, and the identification of the audio link in cable 104 that communicates the second call to voice storage processor 111. Also in block 508, switch processor 102 connects the second calling telephone set to the identified audio link via switching network 101. In block 509, switching processor 102 waits for a message from voice mail system 110. When the message is received from voice mail system 110, decision block 510 determines whether or not the calling party indicated a decision to be placed on hold. If the calling party has indicated to voice mail system 110 the decision to be placed on hold, control is transferred via path 530 to block 511. If the second calling party has chosen to leave a message, then switch processor 102 terminates this call with respect to the personal answer message feature.

Block 511 sends a tone indicating that the second call has been placed on hold to the called party. Control is then transferred to block 515 which camps the second call onto the called telephone set using the standard call processing features of switch processor 102. Next, control is transferred to decision blocks 512 and 514, which give the called party the waiting time interval to terminate the first call. In addition, decision block 512 detects if the second call has been terminated. If the called party terminates the first call during the waiting time interval, decision block 514 detects this fact and control is transferred to block 516 via path 528. The latter block connects the second call to the called telephone set. If the first call has not been terminated, control is passed to decision block 517 which checks if the second call has been terminated. If the second call has been terminated, the "call on hold" tone is transmitted to the called telephone set by block 516; then, control is passed to block 513. If the second call has not been terminated, control is returned to decision block 512 via path 529. If the first call is not terminated in the waiting time interval, control is passed to block 519 via path 527; and block 519 transmits the "call on hold" tone to the called telephone set. Block 519 then transfers control to block 513 which processes the second call as an unanswered call.

Customer premise unit 140 of FIG. 1 illustrates another embodiment in accordance with the invention for providing a personal answer message to a second calling party. Customer premise unit 140 is assumed to be located either in a private residence or in a small business location. Unit 140 is interconnected via telephone lines 146 and 147 to central exchange office 135. An example of the operation of customer premise unit 140 follows. If a first call is in progress on telephone set 149 and a second call is directed to telephone 142 via telephone line 146 by central exchange office 135, the called party activates button 144 on interface 143 to have the personal answer message transmitted to the second calling party. The called party is notified of the second call by telephone set 142 ringing. In response to the actuation of button 144, audio unit 141 connects itself to telephone line 146. Audio unit 141 then verifies that there is ringing on telephone line 146. After the ringing verification, audio unit 141 transmits the following personal answer message on telephone line 146. "John Doe is presently engaged in another telephone conversation, but he is aware of your call and will be with you in thirty seconds or less. If you wish to wait, please remain on the line. If you wish to leave an audio message, press '1' on your telephone." Advantageously, audio unit 141 also detects multi-frequency tones so that the second calling party can indicate whether she/he wants to be placed in a standby mode (on hold) or leave an audio message. If the second calling party indicates that he/she wishes to be placed on hold, then audio unit 141 continues the connection to telephone line 146 and flashes indicator 145 so that the called party knows that the second calling party is on hold.

Figure 6:
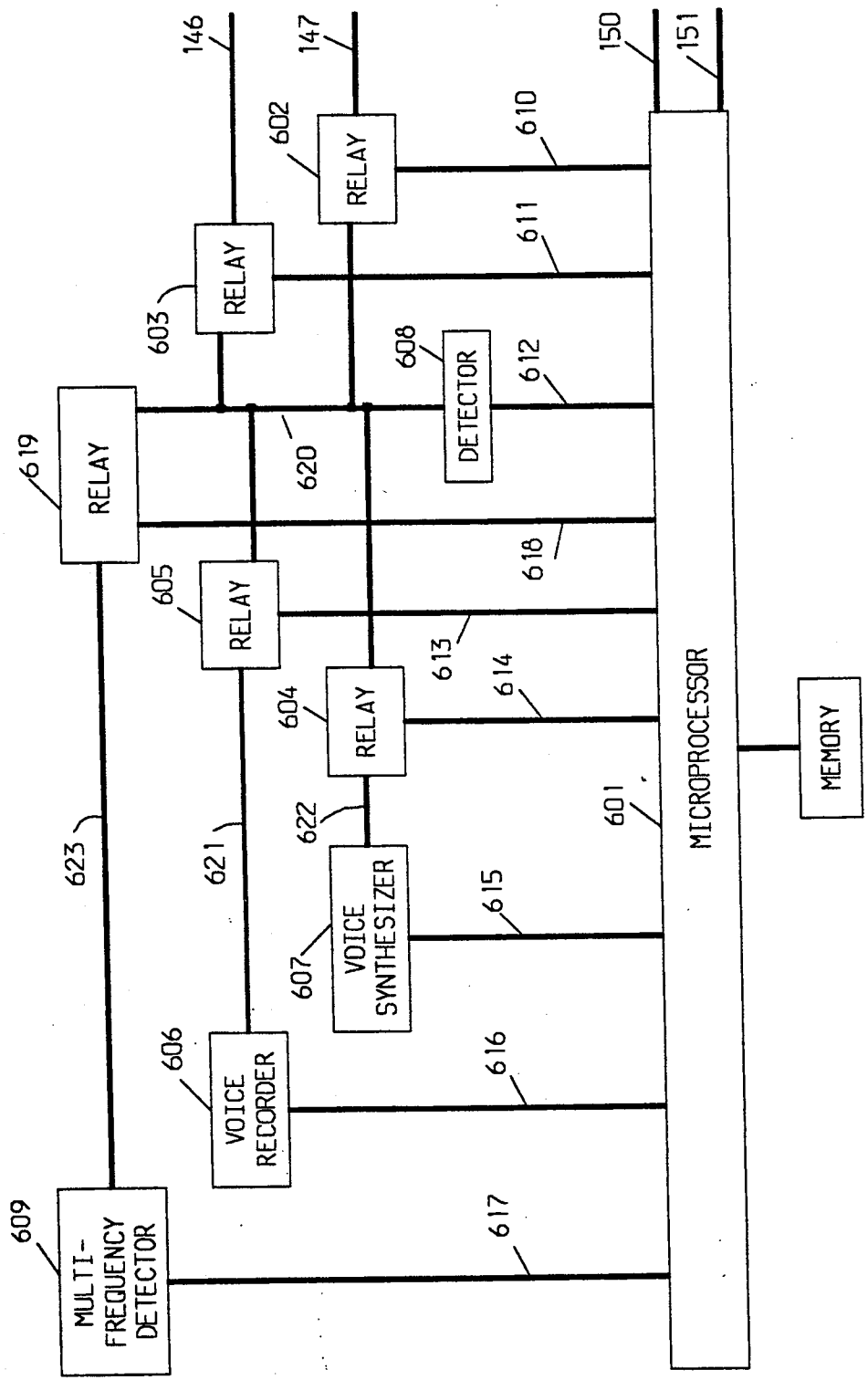
FIG. 6 illustrates, in block diagram form, the audio unit of FIG. 1.

FIG. 6 illustrates audio unit 141 in greater detail. Microprocessor 601 controls the overall operation of audio unit 141. Voice synthesizer 607 generates audio messages under control of microprocessor 601. Voice recorder 606 records the message from the second calling party. Multi-frequency detector 609 detects the depression of a multi-frequency key by a second calling party and transmits the identity of the key to microprocessor 601. Detector 608 detects ringing, an active call, and telephone set 142 or 149 going off hook. Relays 602 through 605 as well as 619 interconnect telephone lines 146 and 147 to cables 620 through 632. Microprocessor 601 may advantageously be a R65F11 manufactured by Rockwell Incorporated with built-in peripheral units for controlling paths 610 through 618 and cables 150 and 151. Voice synthesizer 607 utilizes the SPO256AL2 manufactured by General Instruments, Inc. Voice recorder 607 is a voice actuated tape recorder controlled by microprocessor 601.

Consider how the circuit of FIG. 6 implements the previous example. When the called party presses button 144 in response to ringing on telephone 142, microprocessor 601 responds to a signal transmitted via cable 151 from button 144 to activate relay 603. The latter relay connects telephone line 146 to path 620. Microprocessor 601 then interrogates detector 608 to verify that there is ringing on telephone line 146 from central exchange office 135. After the ringing verification, microprocessor 601 activates relay 604 to interconnect voice synthesizer 607 to path 620. Microprocessor 601 next controls the operation of voice synthesizer 607 by the transmission of information on path 615. microprocessor 606 has transmitted the personal answer message via voice synthesizer 607, microprocessor 601 activates relay 619 via line 618. Microprocessor 601 monitors multi-frequency detector 609 for a reaction time interval via path 617 to determine if multi-frequency detector 609 has detected the depression of a multi-frequency key.

If the second calling party does not depress a multi-frequency button indicating he/she did not want to leave a message, microprocessor 601 flashes indicator 145 on interface 143 via cable 151. During the flashing of indicator 145, microprocessor 601 with detector 608 detects if a call remains on telephone line 146. Microprocessor 601 then provides for the waiting time interval (30 seconds in the present example). If the waiting time interval elapses, microprocessor 601 uses voice synthesizer 607 to give the second calling party the following "sorry" message. " Sorry, John Doe is unable to answer your call, but you may now leave a message for him." In addition, microprocessor 601 determines if the called party has answered the second call by monitoring telephone 142 with detector 608. If microprocessor 601 determines that line 146 is no longer active or that the called party has answered the second call, microprocessor 601 stops flashing indicator 145.

If the second calling party wishes to leave a voice message, microprocessor 601 via voice synthesizer 607 plays a "record" message indicating that the second calling party should start speaking. Microprocessor 601 then activates voice recorder 606 to receive the second calling party's message. Advantageously, the record message is "At the tone, please leave your message." Voice recorder 606 utilizes well known techniques to record only when an individual is speaking. Mircroprocessor 601 detects the end of the second call via detector 608 and deactivates voice recorder 606 as well as relays 602 through 605.

Figure 7:
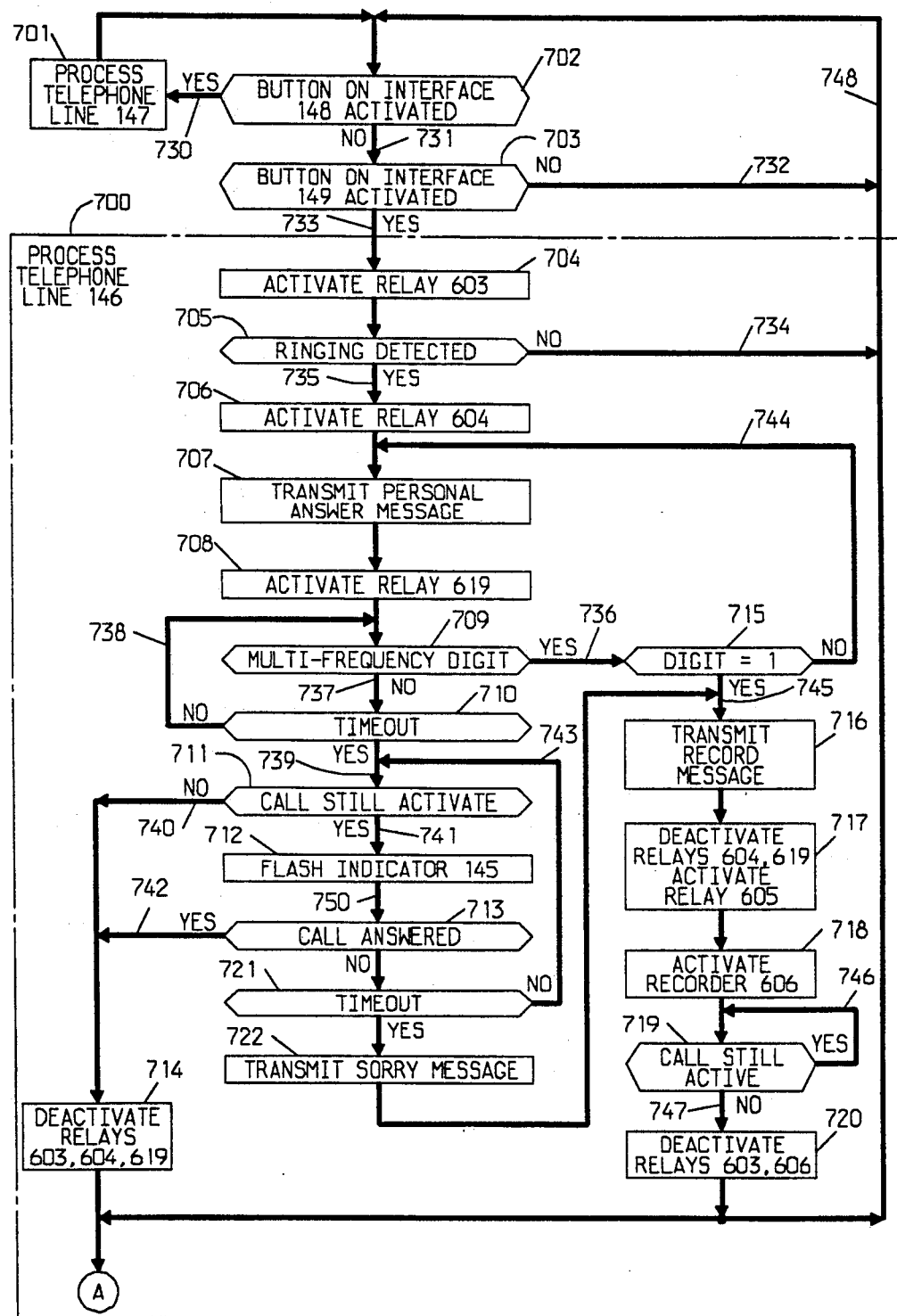
FIG. 7 illustrates, in flow chart form, a program for controlling the operation of the audio unit of FIG. 1 in accordance with the invention.

FIG. 7 illustrates, in flowchart form, the program executed by microprocessor 601. Advantageously, this program is implemented on microprocessor 601 in the FORTH programming language. Block 700 handles the processing of telephone line 146. Block 701 is similar to block 700 and handles the processing of telephone line 147. In the idle state, microprocessor 601 continuously executes decision blocks 702 and 703 which checks for activation of the buttons on interfaces 148 and 149, respectively. If the button on interface 148 is activated, decision block 702 transfers control via path 730 to block 701. Otherwise, decision block 702 transfers control via path 731 to decision block 703. If the button on interface 143 has been activated, decision block 703 transfers control to block 704 via path 733. If the button on interface 143 has not been activated, decision block 703 transfers control back to decision block 702 via path 732.

Once button 144 is activated on interface 143 and control is transferred to block 704, block 704 activates relay 603 which connects telephone line 146 to path 620. Next, decision block 705 detects if ringing is present on telephone line 146. If ringing is detected, control is transferred via path 735 to block 706, which activates relay 604. Relay 604 connects voice synthesizer 607 to path 620 via path 622. Block 707 then transmits the personal answer message which gives instructions to the second calling party via voice synthesizer 607. Block 708 activates relay 619 so that multi-frequency detector 709 is interconnected to path 620 via path 623 and relay 619. If ringing is not present, control is transferred by decision block 705 via path 734 back to decision block 702, since the button 144 had been erroneously activated.

Decision blocks 709 and 710 give the second calling party a reaction time interval to decide whether to leave a voice message or to remain on the telephone line until the called party answers. Decision block 709 interrogates multi-frequency detector 609 to determine if a multi-frequency digit has been detected. If a multi-frequency digit has been detected, control is transferred via path 736 to decision block 715. Decision block 715 determines if the received digit is a "1." If the received digit is not a "1, " control is transferred via path 744 to block 707 to give the second calling party an opportunity to try again. If a digit has not been detected, control is transferred via path 737 to decision block 710.

If the received multi-frequency digit is a "1, " control is transferred via path 745 to block 716. In block 716, microprocessor 601 transmits the appropriate information to voice synthesizer 607 so that the second calling party is instructed to leave a voice message. Block 717 then deactivates relays 604 and 619 and activates relay 605. The activation of relay 605 interconnects voice recorder 606 via path 621, relay 605, path 620 and relay 603 to telephone line 146. Block 718 then activates recorder 606. Recorder 606 is voice activated and records only when the second calling party is leaving a message. Decision block 719 then determines whether or not the call is active. If the call is active, path 746 repeats the test. If the call has been dropped or is no longer active, decision block 719 transfers control via path 747 to block 720. Block 720 deactivates relays 603 and 606 and returns control to decision block 702 via path 748.

If control is transferred by decision block 709 to decision block 710 via path 737 because no multi-frequency digit is detected, decision block 710 determines if the reaction time interval has elapsed. If the time has not elapsed, control is transferred via path 738 back to decision block 709. If the reaction time interval has elapsed, then control is transferred via path 739 to decision block 711. Since the second calling party did not actuate a multi-frequency button, it is assumed that the second calling party decided to be placed "on hold" until the called party finishes the conversation on telephone line 147.

Blocks 711, 712, 713, and 721 are concerned with flashing indicator 145 and with determining (1) if the second calling party terminates the call, (2) if the called party answers the call, and (3) if the waiting time interval has elapsed. When the second call has been terminated or answered, audio unit 141 returns to the idle state and control returns to decision block 702 via path 748. Once the waiting time interval has elapsed, control is transferred to block 722 which transmits to the second calling party the sorry message. Next, block 716 gives the second calling party the opportunity to leave a message.

Decision blocks 711 and 713 utilize detector 608 to determine if the call has been terminated or answered. If the call is still active, decision block 711 transfers control via path 741 to block 712. If the call is not active, control is transferred via path 740 to block 714. Block 712 flashes indicator 145 once each time the block is executed and transfers control to decision block 713. If the second call has been answered, decision block 713 transfers control to decision block 714 via path 742. If the call has not been answered, control is transferred to decision block 711 via path 743. Decision block 714 deactivates relays 603, 604, and 619 before returning control to decision block 702 via path 748.

Figure 8:
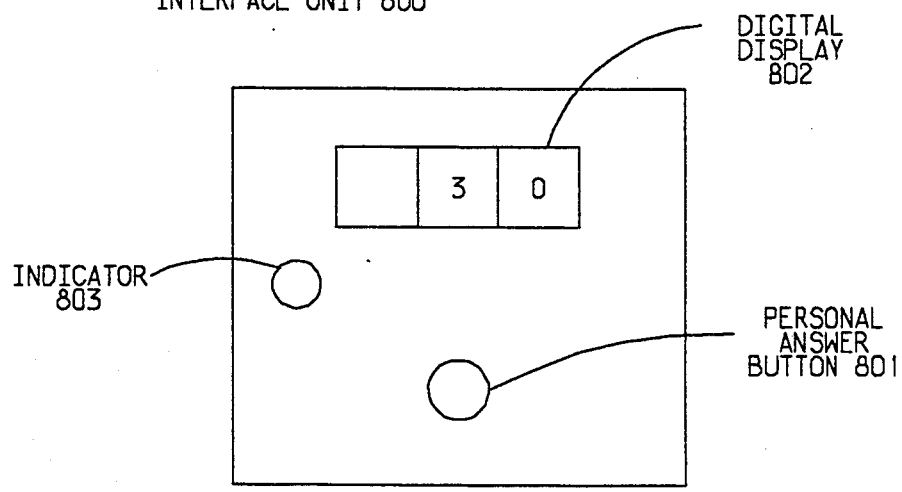
FIG. 8 illustrates an interface of the customer premises unit of FIG. 1.

If interface unit 800 of FIG. 8 replaces interfaces 143 and 148, two additional features are available to the called party using audio unit 141. First, microprocessor 601 continuously displays the amount of time that has elapsed since the second calling party was put on hold. Second, if the called party actuates personal answer button 801 while the second calling party is on hold, microprocessor 601 sets the timed period back to the waiting time interval and transmits a continuation message via voice synthesizer 607 to the second calling party. The continuation message is as follows: "John Doe regrets that he hasn't answered your call but has indicated his desire that you hold for another thirty seconds."

Figure 9:
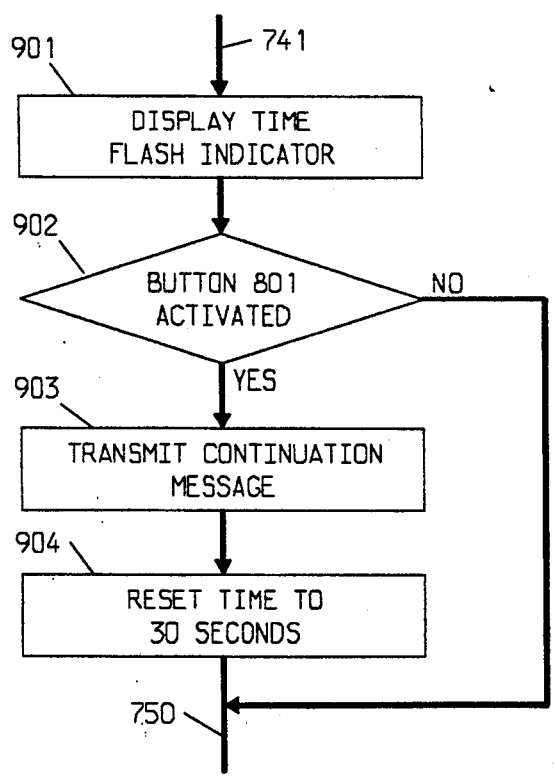
FIG. 9 illustrates, in flow chart form, an addition to the program for controlling the operation of the audio unit of FIG. 1 to provide additional operations in accordance with the invention.

FIG. 9 illustrates, in flowchart form, the additions f the program of FIG. 7 that implement the above features on interface unit 800. Blocks 901 through 904 replace block 712 of FIG. 7. Block 901 displays the remaining time on digital display 802 and flashes indicator 803. Decision block 902 detects the actuation of personal answer button 801. When button 801 is actuated, control is transferred to block 903 which transmits the continuation message to the second calling party. Then, block 904 resets the time interval back to the waiting time interval. If button 801 has not been actuated, control is transferred to block 713 of FIG. 7 via path 750.

Figure 10:
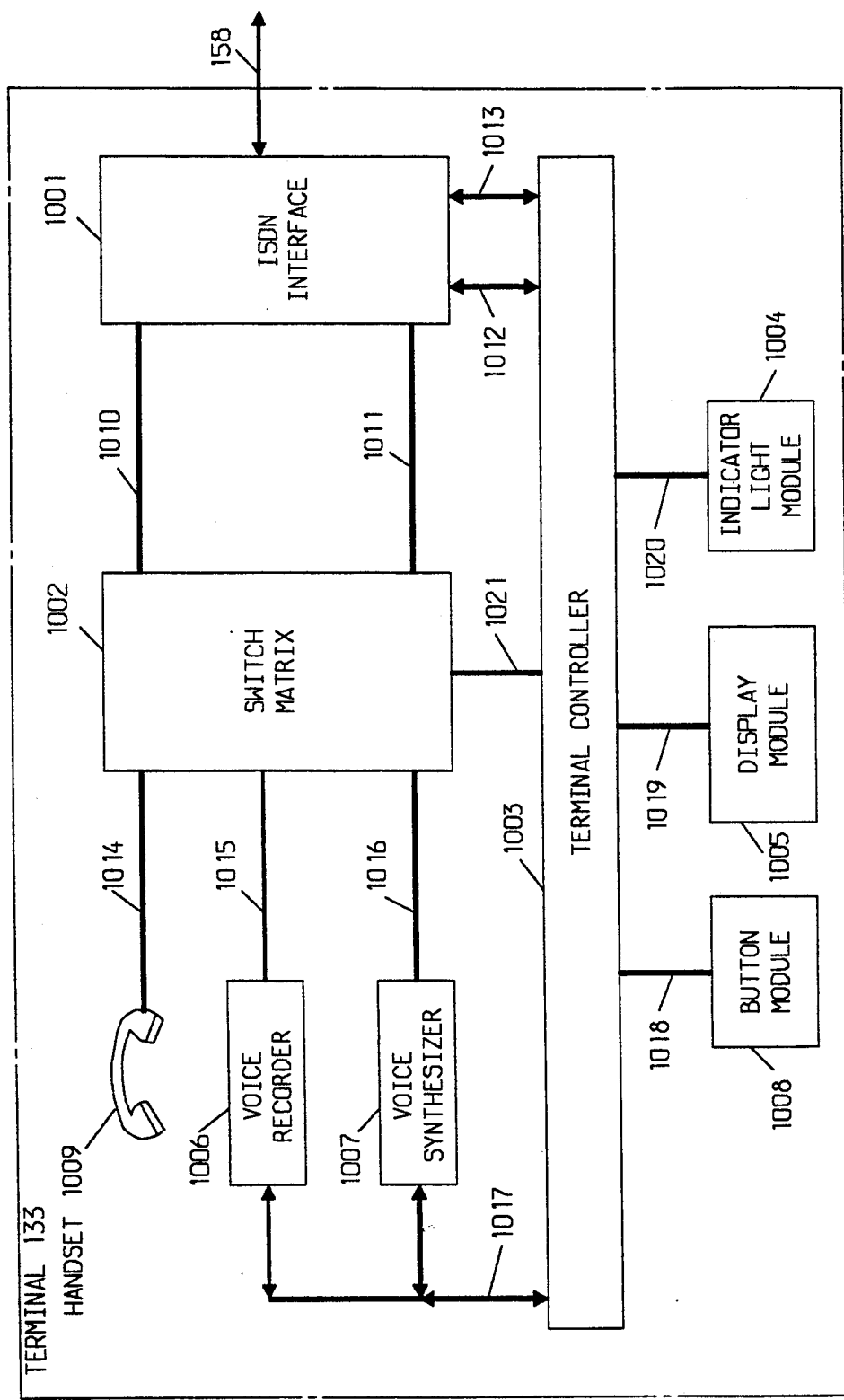
FIG. 10 illustrates, in block diagram form, communication terminal 133 of FIG. 1.
Figure 11:
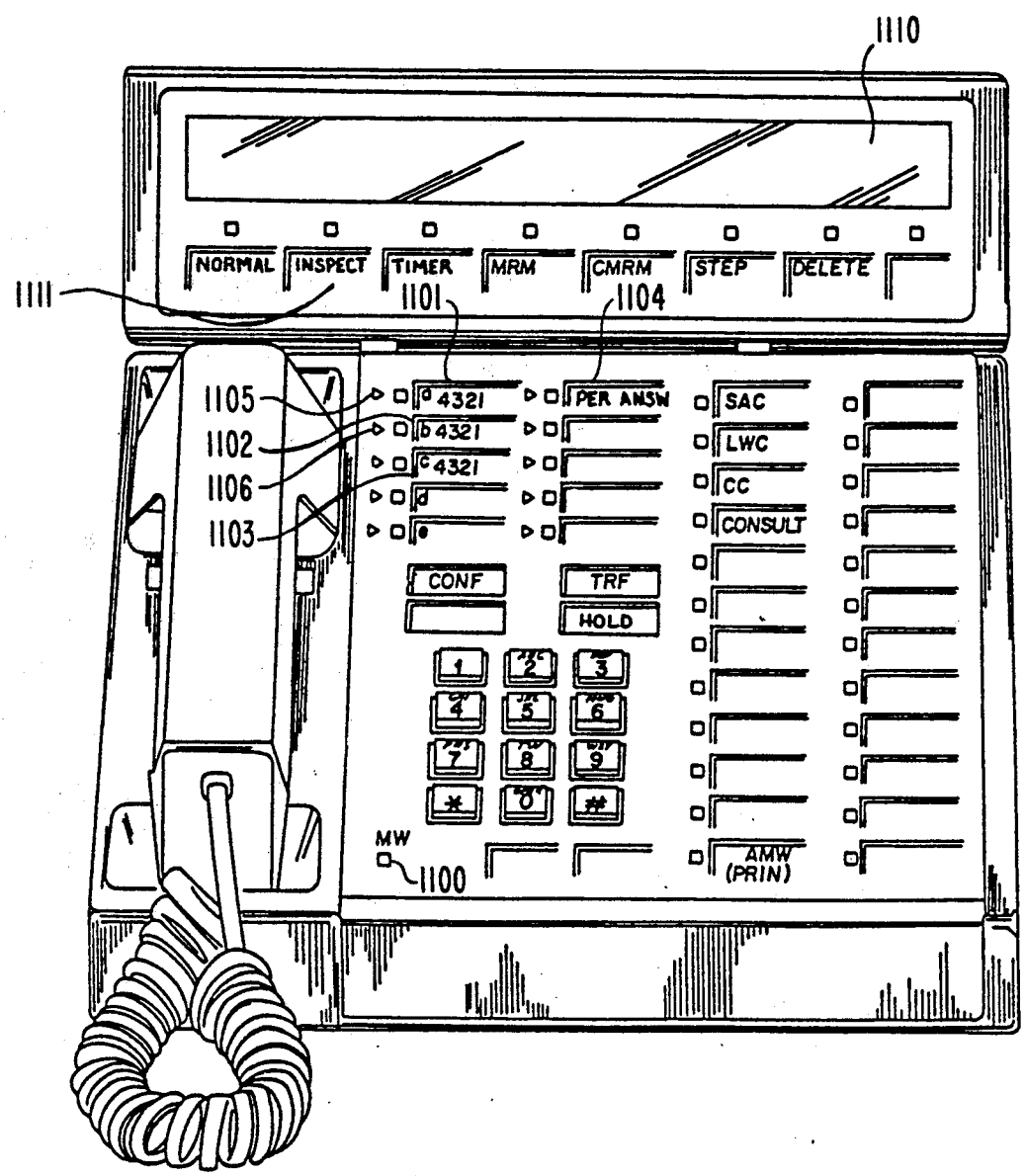
FIG. 11 illustrates the exterior design of communication terminal 133 of FIG. 1.

FIG. 10 and FIG. 11 illustrate a third embodiment in accordance with the invention. FIG. 10 illustrates the circuit of communication terminal 133, and FIG. 11 illustrates the exterior design of communication terminal 133. Communication terminal 133 is interconnected to central exchange office 135 via basic rate interface (BRI) link 158. BRI link 158 has two B channels for the communication of voice/data information and one D channel for the communication of signaling information. ISDN interface 1001 interfaces with BRI link 158 and communicates the first B channel onto path 1010 and the second B channel onto path 1011. ISDN interface 1001 communicates the D channel on path 1012. Terminal controller 1003 controls ISDN interface 1001 via path 1013. ISDN interface 1001 may be advantageously constructed using two AM79C30 integrated circuits manufactured by Advanced Micro Devices, Inc. Terminal controller 1003 is a microprocessor with random access memory, read only memory, and peripheral controllers.

The information on paths 1010 and 1011 may be interconnected by switch matrix 1002 to handset 1009 via path 1014, to voice recorder 1006 via path 1015, and to voice synthesizer 1007 via path 1016. Terminal controller 1003 controls the switching functions of switch matrix 1002 via path 1021. Further, terminal controller 1003 controls the operations of voice recorder 1006 and voice synthesizer 1007 via path 1017.

Terminal 133 also comprises an alphanumeric display, buttons and indicator lights as illustrated in FIG. 11. Terminal controller 1003 controls the alphanumeric display with display module 1005 by information transmitted via path 1019, interrogates the buttons with button module 1008 via path 1018, and illuminates the indicator lights with indicator light module 1004 via path 1020.

The following is an example of the third embodiment in accordance with the invention. If telephone 130 is engaged in a first call with communication terminal 133 (via switching network 101, central exchange office 135, and the first B channel) and a second call is placed from telephone 131 to communication terminal 133, an alerting message is transmitted from central exchange office 135 to communication terminal 133 via the D channel. Terminal controller 1003 is responsive to this alerting message to exchange messages with central exchange office 135 negotiating that the second call should be placed on the idle second B channel of BRI link 158. To notify the called party, terminal controller 1003 then utilizes the calling party identification received from central office 135 and displays this identification on display 1110 via display module 1019. If central exchange office 135 does not provide the calling party identification, terminal controller 1003 displays the message "second call" on display 1110. The called party activates personal answer button 1104 on communication terminal 133. In response to activation of button 1109, terminal controller 1003 connects the second B channel on path 1011 through switch matrix 1002 to voice synthesizer 1007. Terminal controller 1003 then activates voice synthesizer 1007 which transmits the personal answer message to the second calling party. Avantageously, the voice message is "John Doe is presently engaged in another telephone conversation, but he is aware of your call and will be with you in 30 seconds or less." Terminal controller 1003 then times the 30 second interval (waiting time interval) while flashing indicator light 1106 to indicate that the second call has been placed in a standby mode (on hold). When the called party completes the first call, the called party actuates button 1102 to pick up the call. Terminal controller 1003 detects this actuation via button module 1008 and switches path 1011 to handset 1009 via switch matrix 1002 and path 1014. If the called party does not complete the first call within the waiting time interval, terminal controller 1003 switches path 1011 to voice recorder 1006 via switch matrix 1002. Terminal controller 1003 then utilizes voice synthesizer 1007 to inform the second calling party that he/she may leave a message. When a message has been left, terminal controller 1003 activates indicator light 1110 to signify that a message is waiting.

The following describes the operations that the called party performs on communication terminal 133 in the above example. When the called party is speaking to the first calling party, this state is indicated on communication terminal 133 (as illustrated in FIG. 11) by indicator lights 1105 being illuminated. When the second call from telephone set 131 is detected by terminal controller 1003, the latter processor notifies the called party of the presence of the second call by flashing indicator light 1106 and activating a ringer via light module 1004. The called party determines who is calling by activating inspection button 1111, and the name of the second calling party is displayed on alphanumeric display 1110. If the called party wishes to have the personal answer message transmitted to the second calling party, the called party actuates personal answer button 1104. In response to the actuation of personal answer button 1104, terminal controller 1003 connects the second call to voice synthesizer 1007 and controls the latter unit to transmit the personal answer message to the second calling party. When the called party completes the first call, the called party pushes button 1102 to pick up the second call.

FIG. 12 illustrates, in flow chart form, a programming routine executed by terminal controller 1003 to provide the personal answer message feature on communication terminal 133. Block 1201 is entered when the alerting message is received from central exchange office 135. Decision block 1202 determines if communication terminal 133 is presently handling a call (the first call). If there is not a first call, then control is transferred via path 1210 to block 1211 where terminal controller 1003 processes the call using well known techniques. If communication terminal 133 is presently handling a first call, control is transferred via path 1212 to block 1203 which displays the calling party's name. Control is then transferred to decision block 1204. The latter block gives the called party a reaction time interval to respond to the second call by pushing the personal answer button before the call is transferred to normal call processing block 1211. Until the reaction time interval has elapsed, decision block 1204 continuously transfers control to decision block 1205. After the reaction time interval has expired, decision block 1204 transfers control via path 1219 to normal call processing block 1211. In response to this transfer, block 1211 sends a rejection message to central exchange office 135.

If the called party activates the personal answer button, decision block 1205 transfers control via path 1214 to block 1206. In block 1206, terminal controller 1003 transmits to central exchange office 135 a message designating that the second call should be communicated on the idle B channel. Control is transferred to block 1207 which connects voice synthesizer 1007 to the second call and transmits the personal answer message to the second calling party. Next, block 1208 causes indicator 1102 to be flashed. Advantageously, the personal answer message may also be in the form of a data message transmitted via the D channel if the second call is placed from another communication terminal. The other communication terminal then displays the personal answer message on the alphanumeric display.

From block 1208, control is transferred to decision blocks 1209 and 1210 that provide the waiting time interval in which the called party can answer the second call. If the called party answers the second call during the waiting time interval, decision block 1209 detects this fact and control is transferred to block 1211 via path 1215 for normal processing of an answered call. If the second call is not answered during the waiting time interval, control is transferred to block 1221. The latter block uses voice recorder 1006 and voice synthesizer 1007 to record a message from the second calling party. Control is then transferred to block 1211 which terminates the second call.

It is to be understood that the above-described embodiments are merely illustrative of the principles of the invention and that other arrangements may be devised by those skilled in the art without departing from the spirit and scope of the invention.

I claim:

1. A method of communicating between a calling party and a called party already engaged in a first call, said called party utilizing a communication terminal, said method comprising the steps of:
   notifying said called party via said communication terminal of the origination of a second telephone call from said calling party;
   manually activating by said called party via said communication terminal a message to said calling party specifying that said called party will respond to said calling party within a waiting time interval in response to the notification; and
   automatically placing said second call in a standby mode for said called party in response to the activation.

2. The method of claim 1 wherein said activating step comprises the step of transmitting a voice message to said calling party.

3. The method of claim 2 wherein
   said placing step comprises the steps of timing for said waiting time interval; and
   connecting said second call to a message taking service upon said waiting time interval elapsing without said called party answering said second call, thereby allowing said calling party to leave a message.

4. The method of claim 3 further comprising activating, by said called party, another automatic response to said calling party;
   said transmitting step further transmitting another voice message to said calling party in response to the actuation of said other automatic response; and
   said timing step comprises the step of initializing said timing step to time for the entirety of said waiting time interval in response to the actuation of said other automatic response.

5. The method of claim 3 wherein said timing step further comprises the step of displaying the time remaining of said waiting timing interval to said called party.

6. A method of communicating between a calling party and a called party already engaged in a first call, said called party utilizing a communication terminal connected to a telecommunications switching system and said telecommunications switching system being connected to a voice mail system, said method comprising the steps of:
   notifying said called party of the origination of a second call from said calling party by said telecommunications switching system;
   transmitting a signal manually actuated by said called party from said communication terminal to said telecommunications switching system, said signal not interrupting said first call;
   transmitting a voice message, by said voice mail system in response to the transfer of said second call, to said calling party stating that said called party is aware of said second call and specifying that said called party will respond to said calling party within a waiting time interval;

transferring said second call back to said switching system by said voice mail system; and automatically placing said second call on hold for said called party by said telecommunications switching system.

7. The method of claim 6 wherein said communication terminal is a telephone set having an alphanumerical display, a plurality of indicator lights and a plurality of programmable buttons, one of said plurality of buttons programmed to transmit said signal and said notifying step further comprising the step of sending to said telephone set the name of said calling party.

8. The method of claim 7 wherein said placing step comprises the step of flashing one of said indicator lights on said telephone set, thereby indicating to said called party that said calling party is on hold.

9. The method of claim 8 wherein said signal from said called party is generated by the actuation of one of said buttons of said telephone set.

10. The method of claim 6 wherein said communication terminal is a conventional DTMF telephone set and said notifying step comprises the step of transmitting to said telephone set a call waiting tone.

11. The method of claim 10 wherein said signal from said called party is a flash hook signal.

12. The method of claim 11 where said step of placing said telephone call on hold further comprises the step of transmitting an on hold tone to said telephone set, thereby indicating to said called party that said calling party is on hold.

13. The method of claim 10 wherein said voice message further states that by actuating a first multifrequency dialing button on said telephone set of said calling party, said calling party will be placed on hold for said called party or that by actuating a second multifrequency dialing button that said calling party can leave a voice message on said voice mail system for said called party and said step of transmitting said voice message further comprises the step of detecting the actuation of a multifrequency dialing button.

14. A method of communicating between a calling party and a called party already engaged in a first telephone call, said called party utilizing a telephone apparatus interconnected to a telecommunications switching system via two communications channels, said first telephone call being communicated via a first one of said communication channels and a second telephone call being originated from said calling party via a second one of said communication channels, said method comprising the steps of:

detecting by said telephone apparatus a signal from said called party in response to a notification of said second telephone call;

automatically transmitting by said telephone apparatus a voice message to indicate that said called party is aware of said second telephone call to said calling party via said second one of said communication channels in response to the detection of said signal; and indicating the status of said second telephone call to said called party via an indication light on said telephone apparatus.

15. The method of claim 14 wherein said voice message states that said calling party can leave a message by the depression of a multifrequency dialing button and said telephone apparatus comprising means for recording voice and said method further comprising the step of actuating said recording means in response to said depression of said multifrequency dialing button to record a message from said calling party.

16. The method of claim 15 wherein said voice message further specifies that said called party will respond to said calling party within a waiting time interval;

said indicating step comprises the steps of timing said waiting time interval, and connecting said second telephone call to said voice recording means upon said waiting time interval elapsing without said called party answering said second telephone call, thereby allowing said calling party the opportunity to leave a message.

17. The method of claim 16 wherein said detecting step detects another signal from said called party;

said transmitting step transmits another voice message to said calling party in response to the detection of said other signal; and said timing step comprises the step of initiating said timing step to time for the entirety of said waiting time interval.

18. The method of claim 17 wherein said timing step further comprises the step of displaying the time remaining of said waiting time interval to said called party.

19. A method of communicating between a calling party and a called party already engaged in a first call, said called party utilizing a communication terminal interconnected to a telecommunications switching system via a communication link having a signaling channel and two data/voice communication channels and said called party engaged in said first call via a first one of said data/voice communication channels, said method comprising the steps of:

negotiating with said telecommunications switching system the communication of a second telephone call on a second one of said data/voice communication channels in response to an alerting message on said signaling channel indicating the origination of said second telephone call;

notifying said called party of the presence of said second telephone call;

detecting a signal said calling party to transmit another message to said called party;

transmitting in response to said signal said other message to said calling party thereby informing said calling party that said called party is aware of said second telephone call in response to the detection of said signal; and indicating to said called party the ongoing status of said second telephone call.

20. The method of claim 19 wherein said telecommunications switching system transmits the identify of said calling party in said signaling channel and said step of indicating further comprises the step of displaying said identify of said calling party to said called party.

21. The method of claim 19 wherein said other message is a data message.

22. The method of claim 19 wherein said other message is a voice message.

23. An apparatus for communicating between a calling party and a called party already engaged in a first call, said called party utilizing a communication terminal, said apparatus comprising:

means for notifying said called party via said communication terminal of the origination of a second call from said calling party;

means for manually activating by said called party via said communication terminal a message to said calling party specifying that said called party will respond to said calling party within a waiting time interval in response to the notification; and means for automatically placing said second call in a standby mode for said called party in response to the activation.

24. The apparatus of claim 23 whwerein said activating means comprises means for transmitting a voice message to said calling party.

25. The apparatus of claim 24 wherein said placing means comprises means for timing for said waiting time interval; and means for connecting said second call to a message taking service upon said waiting time interval elapsing without said called party answering said second call, thereby allowing said calling party to leave a message.

26. The apparatus of claim 25 further comprising activating, by said called party, another automatic response to said calling party;

said transmitting means further transmitting another voice message to said calling party in response to the actuation of said other automatic response; and said timing means commprising means for initializing said timing means to time for the entirety of said waiting time interval in response to the actuation of said other automatic response.

27. The apparatus of claim 25 wherein said timing means further comprises means for displaying the time remaining of said waiting timing interval to said called party.

28. An apparatus for communicating between a calling party and a called party already engaged in a first call, said called party utilizing a communication terminal connected to a telecommunications switching system and said telecommunications switching system being connected to a voice mail system, and said apparatus comprising:

means for notifying said called party of the origination of a second call from said calling party by said telecommunications switching system;

means for sending a signal manually actuated by said called party from said communication terminal to said telecommunications switching system, and signal not interrupting said first call;

means for transferring said second call to said voice mail system by said telecommunications switching system in response to said signal;

means for transmitting a voice message, by said voice mail system in response to the transfer of said second call, to said calling party stating that said called party is aware of said second call and specifying that said called party will respond to said calling party within a waiting time interval;

measn for transferring second call back to said telecommunications switching system by said voice mail system; and means for automatically placing said second call on hold for said called party by said telecommunications switching system upon said second call being transferred back to said telecommunications switching system by said voice mail system;

29. The apparatus of claim 28 wherein said communication terminal is a telephone set having an alphanumerical display, a plurality of indicator lights and a plurality of programmable buttoms and one of said plurality of buttons programmed to cause transmission of said signal, said notifying means further comprising means for sending to said telephone set the name of said calling party.

30. The apparatus of claim 29 wherein said placing means comprises means for flashing one of said indicator lights on said telephone set, thereby indicating to said called party that said calling party is on hold.

31. The apparatus of claim 30 wherein said signal from said called party is generated by the actuation of one of said buttons of said telephone set.

32. The apparatus of claim 28 wherein said communication terminal is a conventional DTMF telephone set, said notifying means comprising means for transmitting to said telephone set a call waiting tone.

33. The apparatus of claim 32 wherein said signal from said called party is a flash hook signal.

34. The apparatus of claim 33 where said placing means comprises means for transmitting a tone to said telephone set, thereby indicating to said called party that said calling party is on hold.

35. The apparatus of claim 32 wherein said voice messge further stetes that by actuating a first multifrequency dialing button on said telephone set of said calling party that said calling party will be placed on hold for said called party or by actuating a second multifrequency dialing button that said calling party can leave a voice message on said voice mail system for said called party and said voice mail system detecting the actuation of a multifrequency dialing button.

36. A telephone apparatus utilized by a called party for communicating with a calling party and said called party already engaged in a first telephone call, said telephone apparatus interconnected to a telecommunications switching system via two communication channels, said first telephone call being communicated via a first one of said communication channels and a second telephone call being switched by said telecommunications switching system to said called party from said calling party via a second one of said communication channels, said telephone apparatus comprising:

means for detecting a signal from said called party in response to a notification of said second telephone call;

means for automatically transmitting a voice message to indicate that said called party is aware of said second telephone call to said calling party via said second one of said communication channels in response to the detection of said signal; and means for indicating the status of said second telephone call to said called party via an indication light on said telephone apparatus.

37. The telephone apparatus of claim 36 wherein said voice message states that said calling party can leave a message by the depression of a multifrequency dialing button and said telephone apparatus further comprising means for recording voice; and means for actuating said recording means in response to said depression of said multifrequency dialing button to record a message from said calling party.

38. The telephone apparatus of claim 37 wherein said voice message further specifies that said called party will respond to said calling party within a waiting time interval;

said indicating means comprises means for timing said waiting time interval, and means for connecting said second telephone call to said voice recording means upon said waiting time interval elapsing without said called party answering said second telephone call, thereby allowing said calling party the opportunity to leave a message.

39. The telephone apparatus of claim 38 wherein said detecting means detects another signal from said called party; and said transmitting means transmits another voice message to said calling party in response to the detection of said other signal; and said timing means comprises means for initiating said timing means to time for the entirety of said waiting time interval.

40. The telephone apparatus of claim 39 wherein said timing means further comprises means for displaying the time remaining of said waiting time interval to said called party.

41. A communication terminal for communicating between a calling party and a called party already engaged in a first call, said called party utilizing said communication terminal that is interconnected to a telecommunications switching system via a communication link having a signaling channel and two data/voice communication channels, said called party engaged in said first call via a first one of said data/voice channels, and said communication terminal comprising:

means for negotiating with said telecommunications switching system the communication of a second call on a second one of said data/voice communication channels in response to an alerting message on said signaling channel indicating the origination of said second call;

means for notifying said called party of the presence of said second call;

means for detecting a signal from said called party to transmit another message to said calling party;

means responsive to said signal for tranmitting to said calling party said other message thereby informing said calling party that said called party is aware of said second call in response to the detection of said signal; and means for indicating to said called party the ongoing status of said second call.

42. The communication terminal of claim 41 wherein said telecommunciations switching system transmits the identity of said calling party in said signaling channel and said indicating means further comprises means for displaying said identity of said calling party to said called party.

43. The communication terminal of claim 41 wherein said other message is a data message.

44. The communication terminal of claim 41 wherein said other message is a voice message.

* * * * *